(12) United States Patent
Lin et al.

(10) Patent No.: US 9,582,044 B2
(45) Date of Patent: Feb. 28, 2017

(54) SHOCK ABSORPTION STRUCTURE AND ELECTRONIC DEVICE WITH SAME

(71) Applicant: Chiun Mai Communication Systems, Inc., New Taipei (TW)

(72) Inventors: Kuan-Chang Lin, New Taipei (TW); Chia-Che Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/690,011

(22) Filed: Apr. 17, 2015

(65) Prior Publication Data

US 2016/0216740 A1    Jul. 28, 2016

(51) Int. Cl.
 *G06F 1/16* (2006.01)
 *G06F 1/18* (2006.01)

(52) U.S. Cl.
 CPC ............ *G06F 1/1658* (2013.01); *G06F 1/187* (2013.01)

(58) Field of Classification Search
 CPC .......... G06F 1/1601; G06F 1/203; G06F 1/16; G06F 1/1658; G06F 1/187; G06F 1/184; G06F 1/1616; G06F 1/181; G06F 1/1679; H05K 7/02; H05K 5/00; H05K 5/02; G11B 33/08; G11B 33/124
 USPC ............ 361/679.01–679.58, 679.55–679.58, 361/679.34, 724–727, 679.33–679.39; 312/223.1–223.2
 See application file for complete search history.

(56) References Cited

U.S. PATENT DOCUMENTS

| | | | |
|---|---|---|---|
| 7,667,925 B2 * | 2/2010 | Kim ..................... | G11B 5/5582 360/97.19 |
| 2012/0188741 A1 * | 7/2012 | Liu ....................... | G11B 33/08 361/809 |

* cited by examiner

*Primary Examiner* — Anthony Haughton
*Assistant Examiner* — Ingrid Wright
(74) *Attorney, Agent, or Firm* — Zhigang Ma

(57) ABSTRACT

A shock absorption structure includes a receiving portion and at least one shock absorption assembly. The receiving portion is configured to receive a main body of an electronic device. Each shock absorption assembly includes a fixing member, a mounting member, and an elastic member. The fixing member is secured to the receiving portion. The mounting member is mounted to the fixing member and defines a through hole. The elastic member is received in the through hole and is configured to seals a gap between the mounting member and the main body.

15 Claims, 6 Drawing Sheets

SHOCK ABSORPTION STRUCTURE AND ELECTRONIC DEVICE WITH SAME

CROSS-REFERENCE TO RELATED APPLICATIONS

This application claims priority to Taiwanese Patent Application No. 104102229 filed on Jan. 23, 2015, the contents of which are incorporated by reference herein.

FIELD

The subject matter herein generally relates to a shock absorption structure and an electronic device with the shock absorption structure.

BACKGROUND

Electronic devices, such as various data storage devices (for example, hard disk drives), are usually installed in a computer for communicating and handling data. When the data storage device is running, vibrations will be generated therefrom and may damage the data storage device. Therefore, a shock absorption structure is provided for absorbing vibrations from the data storage device. However, a structure of the shock absorption structure is commonly complicated, which will affect a reduce of a cost of the electronic device.

BRIEF DESCRIPTION OF THE DRAWINGS

Implementations of the present technology will now be described, by way of example only, with reference to the attached figures.

DETAILED DESCRIPTION

Figure 1:
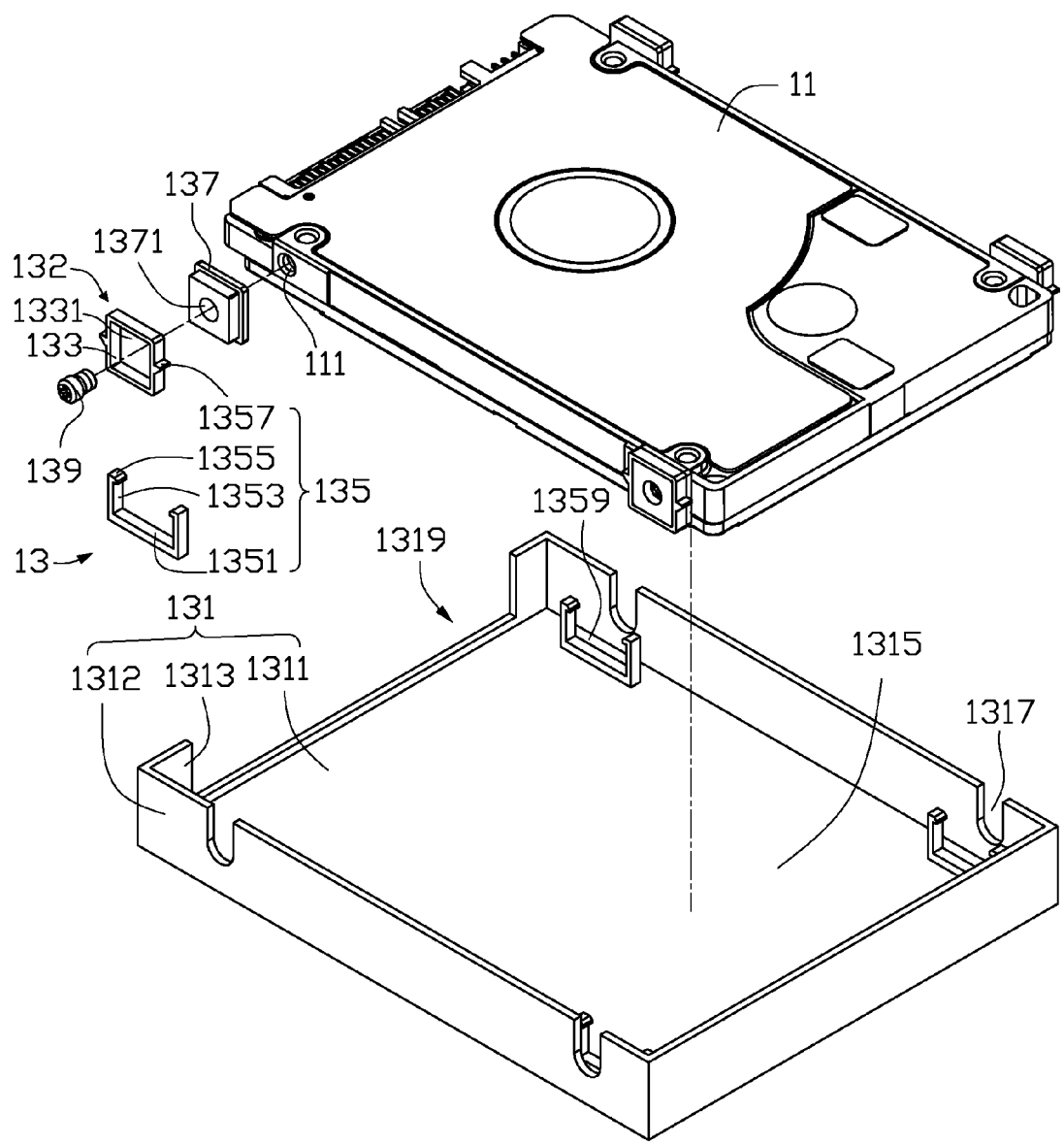
FIG. 1 is an exploded, isometric view of a first embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates a first embodiment of an electronic device 100. The electronic device 100 can be a data storage device or the like. In this embodiment, the electronic device 100 is a hard disk drive (HDD). The electronic device 100 includes a main body 11 and a shock absorption structure 13. Two opposite sides of the main body 11 define at least one receiving hole 111. In this embodiment, each side of the main body 11 defines two receiving holes 111.

The shock absorption structure 13 includes a receiving portion 131 and at least one shock absorbing assembly 132. The receiving portion 131 includes a plate body 1311, two oppositely-facing first edges 1312, and two oppositely-facing second edges 1313. The first edges 1312 and the second edges 1313 extend substantially perpendicularly from peripheral edges of the plate body 1311, thereby cooperatively defining a receiving space 1315. The receiving space 1315 corresponds to the main body 11 and is configured to receive the main body 11. Each first edge 1312 defines at least one opening 1317. In this embodiment, each first edge 1312 defines two openings 1317. Each opening 1317 is substantially U-shaped and is in communication with the receiving space 1315. One of the two second edges 1313 defines an entrance 1319. The entrance 1319 is substantially rectangular and is in communication with the receiving space 1315. The main body 11 can be received in the receiving space 1315 through the entrance 1319.

In this embodiment, the shock absorption structure 13 includes four shock absorbing assemblies 132. The four shock absorbing assemblies 132 are all mounted in the receiving space 1315 and are positioned at two opposite sides of the main body 11. The four shock absorbing assemblies 132 are configured to absorb vibrations generated by the main body 11 and reduce a noise from the main body 11.

Each shock absorbing assembly 132 includes a mounting member 133, a fixing member 135, an elastic member 137, and a latching member 139. The mounting member 133 is substantially rectangular. The mounting member 133 is secured to the receiving portion 131 through the fixing member 135 and is sandwiched between the first edge 1312 and the main body 11 of the electronic device 100. The mounting member 133 defines a mounting hole 1331.

The fixing member 135 includes a fixing portion 1351, two extending portions 1353, at least one first clasp portion 1355, and at least one second clasp portion 1357. The fixing portion 1351 is substantially a strip and is secured on the plate body 1311. The two extending portions 1353 are substantially perpendicularly positioned at two ends of the fixing portion 1351. The two extending portions 1353 and the fixing portion 1351 cooperatively form a U-shaped receiving slot 1359. The receiving slot 1359 is aligned with the opening 1317. The receiving slot 1359 has a shape and a structure corresponding to a shape and a structure of the mounting member 133 and is configured to receive the mounting member 133.

In this embodiment, each fixing member 135 includes two first clasp portions 1355 and two second clasp portions 1357.

The first clasp portions 1355 and the second clasp portions 1357 are hooks. The two first clasp portions 1355 are positioned at two ends of the extending portions 1353 away from the fixing portion 1351 and extend towards the receiving slot 1359. That is, the two first clasp portions 1355 face each other. The two second clasp portions 1357 are positioned at two ends of the mounting member 133. When the mounting member 133 is received in the receiving slot 1359, the second clasp portions 1357 are latched with the first clasp portions 1355 so that the mounting member 133 is steadily assembled to the receiving portion 131 through the fixing member 135.

The elastic member 137 has a shape and a structure corresponding to a shape and a structure of the mounting hole 1331. The elastic member 137 is configured to be received in the mounting hole 1331 of the mounting member 133 and seal a gap between the mounting member 133 and the main body 11. The elastic member 137 can be made of elastic material, such as polyvinyl chloride (PVC) or other material having a better performance for absorbing vibrations of the main body 11. In this embodiment, the elastic member 137 is a gasket. A through hole 1371 is defined at a middle of the elastic member 137. The through hole 1371 corresponds to the receiving hole 111.

In this embodiment, the latching member 139 is a screw. When the latching member 139 passes through the opening 1317, the through hole 1371, and the receiving hole 111 of the main body 11 in order, the shock absorbing assembly 132 is assembled to the main body 11.

Figure 2:
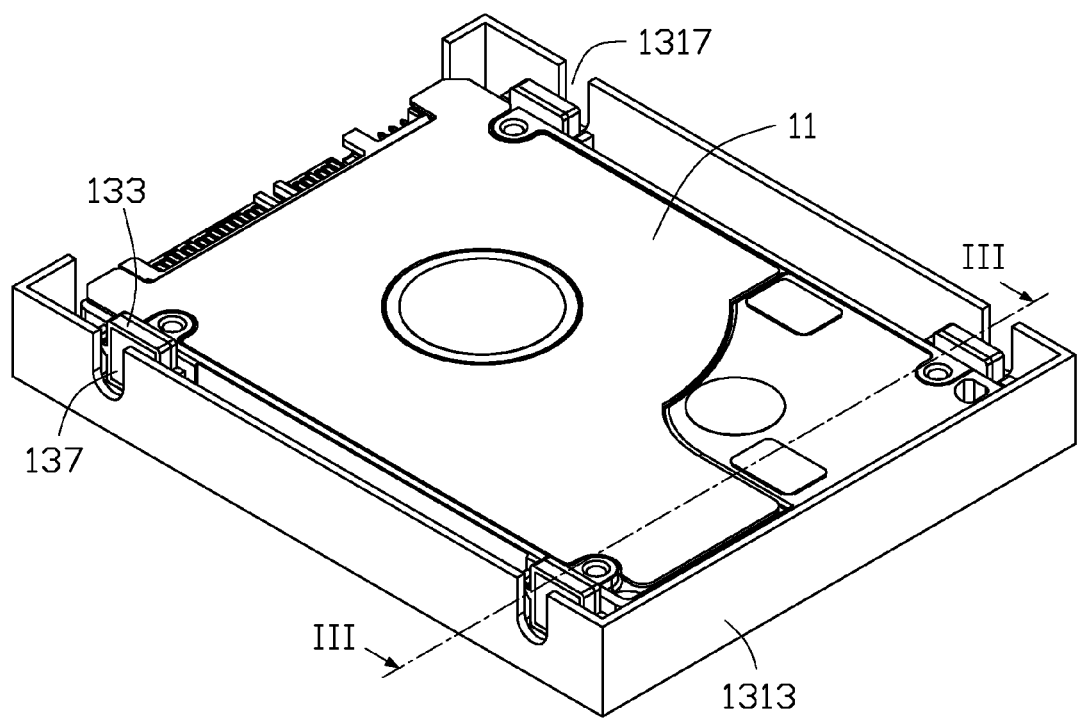
FIG. 2 is an assembled, isometric view of the electronic device of FIG. 1.
Figure 3:
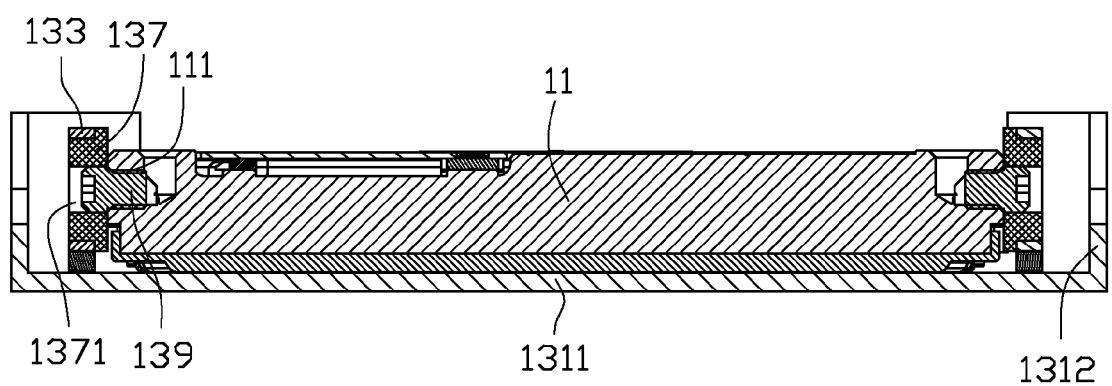
FIG. 3 is a cross-sectional view taken along line III-III of FIG. 2.

Referring to FIGS. 2 and 3, in assembly of the electronic device 100, the fixing portions 1351 are secured to the plate body 1311 through glue or the like. Each receiving slot 1359 of the fixing portions 1351 is aligned with one opening 1317. Each mounting member 133 is aligned with one receiving slot 1359 and the second clasp portions 1357 on the mounting member 133 are aligned with the first clasp portions 1355 of the fixing member 135. Each mounting member 133 is pressed to be received in one receiving slot 1359 and the second clasp portions 1357 are latched with the first clasp portions 1355. Then, each mounting member 133 is mounted to the receiving portion 131 through one fixing member 15. Each elastic member 137 is aligned with one mounting hole 1331. The elastic member 137 is pressed and is received in one mounting hole 1331.

The main body 11 is aligned with the entrance 1319 and is pushed towards the entrance 1319. Then, the main body 11 is received in the receiving space 1315 and each receiving hole 111 of the main body 11 is aligned with one through hole 1371 and the opening 1317. Each latching member 139 is inserted into one opening 1317 and the through hole 1371, and is further received in the assembling hole 111 of the main body 11. Thus, the electronic device 100 is completely assembled and each fixing member 135 assembled with the mounting member 133 and the elastic member 137 is sandwiched between the main body 11 and the first edge 1312. Because the shock absorbing assemblies 132 are assembled at two sides of the main body 11, each elastic member 137 seals a gap between the main body 11 and the mounting member 133, thereby absorbing vibrations generated by the main body 11 and reduce a noise from the main body 11.

In other embodiment, the elastic member 137 can be integrally formed with the mounting member 133.

Figure 4:
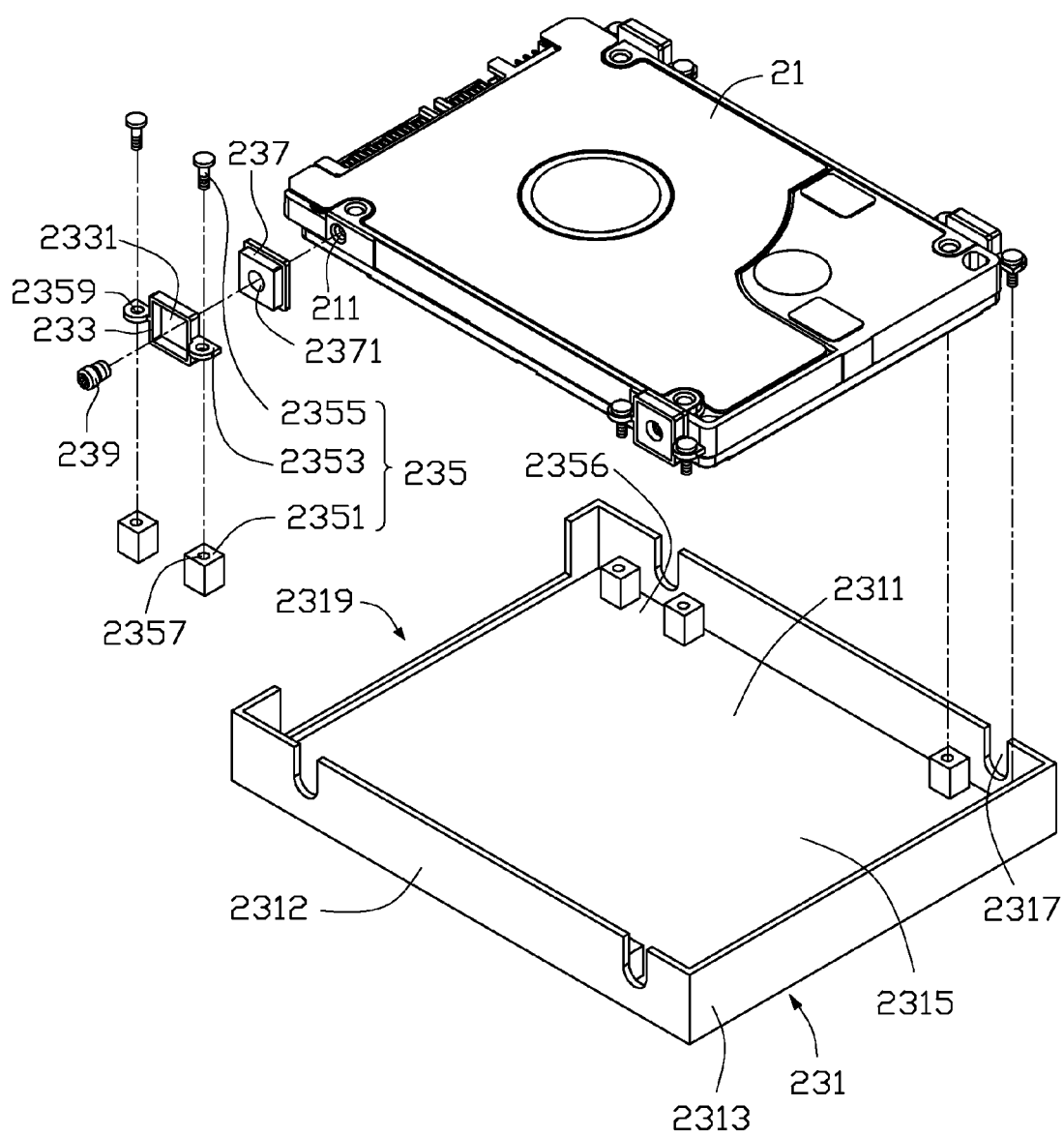
FIG. 4 is an exploded, isometric view of a second embodiment of an electronic device.

FIG. 4 illustrates a second embodiment of the electronic device 200. The electronic device 200 differs from the electronic device 100 in that a structure of the fixing member 235 is different from the structure of the fixing member 135.

In detail, the fixing member 235 includes two fixing blocks 2351, two matching portions 2353, and two assembling portions 2355. The two fixing blocks 2351 are positioned on the plate body 2311 and are spaced apart from each other. The two fixing blocks 2351 and the plate body 2311 cooperatively form a receiving slot 2356. The receiving slot 2356 is configured to receive the mounting member 233. Each fixing block 2351 defines a first assembling hole 2357. The two matching portions 2353 are substantially sheets and are positioned at two opposite sides of the mounting member 233. Each matching portion 2353 defines a second assembling hole 2359. The second assembling hole 2359 corresponds to the first assembling hole 2357. In this embodiment, the two assembling portions 2355 are both screws. When each assembling portion 2355 passes through one first assembling hole 2357 and the second assembling hole 2359, the mounting member 233 is fixed to the receiving portion 231 through the fixing member 235.

Figure 5:
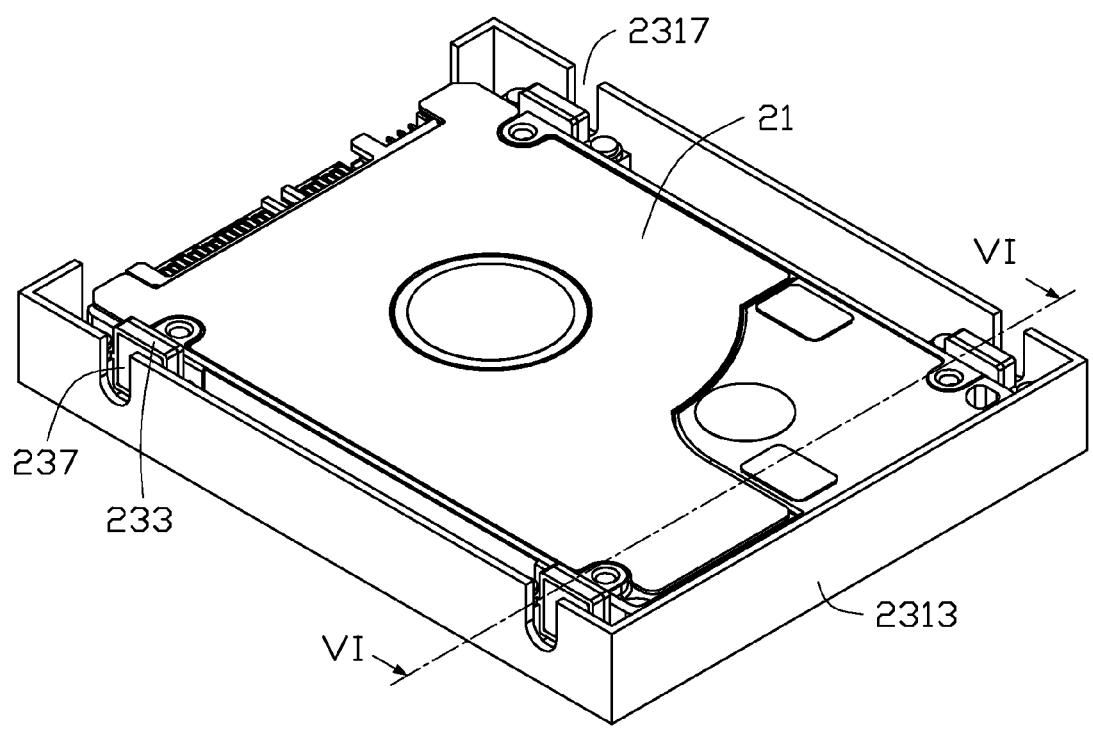
FIG. 5 is an assembled, isometric view of the electronic device of FIG. 4.
Figure 6:
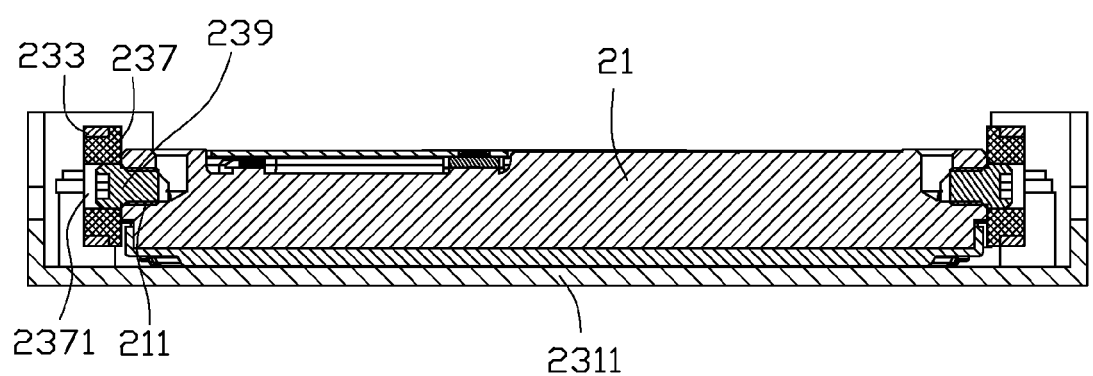
FIG. 6 is a cross-sectional view taken along line VI-VI of FIG. 5.

Referring to FIGS. 5 and 6, in assembly of the electronic device 200, each fixing blocks 2351 is secured to the plate body 2311 through glue or the like. Each receiving slot 2356 is aligned with one opening 2317. Each mounting member 233 is aligned with one receiving slot 2356 and is received in the receiving slot 2356. Then, the matching portions 2353 are positioned on the fixing blocks 2351 and the second assembling holes 2359 are aligned with the first assembling holes 2357. Each assembling portion 2355 is inserted into one second assembling hole 2353 and the first assembling hole 2357. Then, each mounting member 233 is assembled to the receiving portion 231. Each elastic member 237 is aligned with one mounting hole 2331. The elastic member 237 is pressed and is received in one mounting hole 2331.

The main body 21 is aligned with the entrance 2319 and is pushed towards the entrance 2319. Then, the main body 21 is received in the receiving space 2315 and each receiving hole 211 of the main body 21 is aligned with one through hole 2371 and the opening 2317. Each latching member 239 is inserted into one opening 2317 and the through hole 2371, and is further received in the assembling hole 211 of the main body 21. Thus, the electronic device 200 is completely assembled.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A shock absorption structure comprising:
  a receiving portion configured to receive a main body of an electronic device and comprising a plate body and two oppositely-facing first edges, the first edges extending substantially perpendicularly from peripheral edges of the plate body, each first edge defining at least one opening; and
  at least one shock absorption assembly, each shock absorption assembly comprising:
    a fixing member secured to the receiving portion;
    a mounting member mounted to the fixing member and defining a through hole;

an elastic member received in the through hole and configured to seal a gap between the mounting member and the main body; and a latching member;

wherein the shock absorption assembly is assembled to the main body through the latching member passing through the opening and the through hole.

2. The shock absorption structure of claim 1, wherein the receiving portion further comprises two oppositely-facing second edges, the second edges extend substantially perpendicularly from peripheral edges of the plate body, thereby the plate body, the first edges, and the second edges cooperatively defining a receiving space; the receiving space is configured to receive the main body.

3. The shock absorption structure of claim 1, wherein the fixing member comprises a fixing portion and two extending portions, the fixing portion is secured on the plate body; the two extending portions are substantially perpendicularly positioned at two ends of the fixing portion; the two extending portions and the fixing portion cooperatively form a U-shaped receiving slot for receiving the mounting member.

4. The shock absorption structure of claim 3, wherein the fixing member further comprises at least one first clasp portion and at least one second clasp portion; the two first clasp portions are positioned at two ends of the extending portions away from the fixing portion and extend towards the receiving slot; the two second clasp portions are positioned at two ends of the mounting member; the second clasp portions are latched with the first clasp portions when the mounting member is received in the receiving slot.

5. The shock absorption structure of claim 4, wherein the first clasp portions and the second clasp portions are hooks.

6. The shock absorption structure of claim 1, wherein the fixing member comprises two fixing blocks, the two fixing blocks are positioned on the plate body and are spaced apart from each other, thereby cooperatively forming a receiving slot with the plate body, the receiving slot is configured to receive the receive the main body.

7. The shock absorption structure of claim 6, wherein the fixing member further comprises two matching portions and two assembling portions; each fixing block defines a first assembling hole; the two matching portions are positioned at two ends of the mounting member and each matching portion defines a second assembling hole; and each assembling portion is inserted into one first assembling hole and the second assembling hole.

8. An electronic device comprising:

a main body; and a shock absorption structure, the shock absorption structure comprising:

a receiving portion configured to receive the main body and comprising a plate body and two oppositely-facing first edges, the first edges extending substantially perpendicularly from peripheral edges of the plate body, each first edge defining at least one opening; and at least one shock absorption assembly, each shock absorption assembly comprising:

a fixing member secured to the receiving portion;

a mounting member mounted to the fixing member and defining a through hole;

an elastic member received in the through hole and configured to seal a gap between the mounting member and the main body; and a latching member;

wherein the shock absorption assembly is assembled to the main body through the latching member passing through the opening and the through hole.

9. The electronic device of claim 8, wherein the receiving portion further comprises a two oppositely-facing second edges, the second edges extend substantially perpendicularly from peripheral edges of the plate body, thereby the plate body, the first edges, and the second edges cooperatively defining a receiving space; the receiving space is configured to receive the main body.

10. The electronic device of claim 8, wherein the fixing member comprises a fixing portion and two extending portions, the fixing portion is secured on the plate body; the two extending portions are substantially perpendicularly positioned at two ends of the fixing portion; the two extending portions and the fixing portion cooperatively form a U-shaped receiving slot for receiving the mounting member.

11. The electronic device of claim 10, wherein the fixing member further comprises at least one first clasp portion and at least one second clasp portion; the two first clasp portions are positioned at two ends of the extending portions away from the fixing portion and extend towards the receiving slot; the two second clasp portions are positioned at two ends of the mounting member; the second clasp portions are latched with the first clasp portions when the mounting member is received in the receiving slot.

12. The electronic device of claim 11, wherein the first clasp portions and the second clasp portions are hooks.

13. The electronic device of claim 8, wherein the fixing member comprises two fixing blocks, the two fixing blocks are positioned on the plate body and are spaced apart from each other, thereby cooperatively forming a receiving slot with the plate body, the receiving slot is configured to receive the receive the main body.

14. The electronic device of claim 13, wherein the fixing member further comprises two matching portions and two assembling portions; each fixing block defines a first assembling hole; the two matching portions are positioned at two ends of the mounting member and each matching portion defines a second assembling hole; and each assembling portion is inserted into one first assembling hole and the second assembling hole.

15. An electronic device comprising:

a main body;

a receiving portion configured to receive the main body and comprising a plate body and two oppositely-facing first edges, the first edges extending substantially perpendicularly from peripheral edges of the plate body, each first edge defining at least one opening; and at least one shock absorption assembly, each shock absorption assembly comprising:

a fixing member secured to the receiving portion;

a mounting member mounted to the fixing member and defining a through hole;

an elastic member received in the through hole and configured to seal a gap between the mounting member and the main body; and a latching member;

wherein the shock absorption assembly is assembled to the main body through the latching member passing through the opening and the through hole.

\* \* \* \* \*